United States Patent
Yokota et al.

(10) Patent No.: US 9,110,542 B2
(45) Date of Patent: Aug. 18, 2015

(54) POSITION DETECTION APPARATUS WITH A MAGNETIC FLUX DETECTING SUBSTRATE

(75) Inventors: Masaru Yokota, Saitama (JP); Hiroshi Munakata, Saitama (JP); Yuta Sato, Saitama (JP); Takenori Kaneda, Tochigi (JP); Takaaki Nakata, Saitama (JP)

(73) Assignee: Wacom Co., Ltd., Saitama (JP)

( * ) Notice: Subject to any disclaimer, the term of this patent is extended or adjusted under 35 U.S.C. 154(b) by 969 days.

(21) Appl. No.: 12/844,217

(22) Filed: Jul. 27, 2010

(65) Prior Publication Data

US 2011/0069022 A1    Mar. 24, 2011

(30) Foreign Application Priority Data

Sep. 21, 2009   (JP) ................ 2009-218230

(51) Int. Cl.
*G06F 3/044* (2006.01)
*G06F 3/041* (2006.01)
*G06F 3/046* (2006.01)

(52) U.S. Cl.
CPC ............... *G06F 3/044* (2013.01); *G06F 3/046* (2013.01); *G06F 3/0416* (2013.01); *G06F 2203/04106* (2013.01)

(58) Field of Classification Search
CPC ....... G06F 3/0416; G06F 3/044; G06F 3/045; G06F 3/047; G06F 3/041; G06F 2203/04111; G06F 2203/04113; G06F 3/046; G06F 3/03545; G06F 2203/04106
USPC ............ 345/173–179, 905; 178/18.01–20.01; 439/59–62, 76.1, 77–78
See application file for complete search history.

(56) References Cited

U.S. PATENT DOCUMENTS 6,728,519 B1   4/2004   Okuda
2005/0046622 A1*   3/2005   Nakanishi et al. ............ 345/173
(Continued)

FOREIGN PATENT DOCUMENTS

EP   1 973 089 A1   9/2008
EP   2 077 489 A1   7/2009
(Continued)

OTHER PUBLICATIONS

Extended European Search Report, for corresponding European Application No. 10175426.5, dated May 4, 2011, 2 pages.
Japanese Office Action dated Jun. 27, 2013, for corresponding JP Application No. 2009-218230, 4 pages.
(Continued)

*Primary Examiner* — Temesgh Ghebretinsae
*Assistant Examiner* — Keith Crawley
(74) *Attorney, Agent, or Firm* — Seed IP Law Group PLLC (57) ABSTRACT

A position detection apparatus includes: a sensor substrate having a detection region in which position detecting electrodes are formed and a wiring line region in which wiring lines led out from the position detecting electrodes are disposed; a processing circuit connected to the wiring lines of the sensor substrate and configured to carry out a predetermined signal process based on a signal from the sensor substrate; and a housing having the sensor substrate placed thereon and having the processing circuit provided therein; the sensor substrate placed on the housing having a through-hole provided therein in the proximity of the detection region for allowing the wiring lines to be threaded therethrough.

9 Claims, 8 Drawing Sheets

(56) References Cited

U.S. PATENT DOCUMENTS

| | | | |
|---|---|---|---|
| 2007/0279395 A1* | 12/2007 | Philipp et al. | 345/173 |
| 2007/0291963 A1 | 12/2007 | Watanabe et al. | |
| 2008/0053713 A1* | 3/2008 | Huang et al. | 178/18.03 |
| 2008/0100592 A1 | 5/2008 | Shigeno et al. | |
| 2008/0180390 A1 | 7/2008 | Yoshikawa | |
| 2009/0033634 A1* | 2/2009 | Shih et al. | 345/173 |
| 2009/0115743 A1* | 5/2009 | Oowaki | 345/174 |
| 2009/0166100 A1* | 7/2009 | Matsubara | 178/18.06 |
| 2009/0205879 A1* | 8/2009 | Halsey, IV et al. | 178/18.06 |
| 2009/0211818 A1 | 8/2009 | Kondo et al. | |
| 2010/0026648 A1* | 2/2010 | Kimura et al. | 345/173 |

FOREIGN PATENT DOCUMENTS

| | | | |
|---|---|---|---|
| JP | 2000148394 A | 5/2000 | |
| JP | 2001102763 A | 4/2001 | |
| JP | 2001168546 A | 6/2001 | |
| JP | 2008097283 A | 4/2008 | |
| JP | 2008134764 A | 6/2008 | |
| JP | 2009162538 A | 7/2009 | |
| WO | 2006/130749 A1 | 12/2006 | |

OTHER PUBLICATIONS

Japanese Office Action dated May 27, 2014, for corresponding JP Application No. 2009-218230, 2 pages.

* cited by examiner

POSITION DETECTION APPARATUS WITH A MAGNETIC FLUX DETECTING SUBSTRATE

CROSS-REFERENCE TO RELATED APPLICATION

The present application claims the benefit under 35 U.S.C. §119(a) of Japanese Patent Application No. 2009-218230, filed, Sep. 21, 2009, the entire content of which is incorporated by reference herein.

BACKGROUND OF THE INVENTION

1. Field of the Invention

This invention relates to a position detection apparatus which carries out position detection based on capacitance.

2. Description of the Related Art

A position detection apparatus is conventionally known wherein an inputting unit including a first detector utilizing capacitance and a second detector utilizing electromagnetic induction disposed in a superposed relationship with each other is fitted in an opening of a case. A position detection apparatus of the type described is disclosed, for example, in Japanese Patent Laid-Open No. 2009-162538 (pages 4 to 8 and FIGS. 1 to 11) (hereinafter referred to as Patent Document 1). In the position detection apparatus of the type described, the first detector detects the position pointed to using the human body such as a finger. Meanwhile, the second detector detects the position pointed to using a position pointer of the pen type in which a resonance circuit formed from a coil and a capacitor is built in.

SUMMARY OF THE INVENTION

Since the position detection apparatus disclosed in Patent Document 1 is structured such that the detectors are fitted in the opening of the case, it is necessary to lead out wiring lines for electrically connecting the first detector positioned closely to the surface of the position detection apparatus and a processing circuit to each other on the rear side of the position detection apparatus. Therefore, the position detection apparatus has problems that time is required to lead out the wiring lines and that the structure of the connecting portions of the wiring lines is complicated. For example, since side walls for defining the opening of the case are provided around the first detector, the wiring lines cannot be laid as they are in a horizontal direction. Therefore, lead wires are led out from the rear side of the first detector as shown in the FIG. 6 of Patent Document 1. However, since the second detector is disposed below the first detector, the lead wires must be devised so as not to interfere with the second detector. Consequently, a working step of leading out the wiring lines is required. Further, if it is tried to increase the area of the detection region of the first detector, then the structure around the connecting portions becomes complicated.

Further, in the position detection apparatus disclosed in Patent Document 1, a cover is disposed in an overlapping relationship on the first detector positioned closely to the surface of the position detection apparatus. Usually, the cover is adhered to the surface of the first detector using a bonding agent. Thus, there is a problem that air bubbles may possibly enter a gap between the first detector and the cover when the cover is adhered. The air bubbles once entering the gap cannot be removed after the adhesion therearound ends. Besides, where such air bubbles enter, the distance between the surface of the first detector and the human body varies depending upon the presence or absence of air bubbles, and this gives rise to deterioration of the accuracy in position detection. Further, if convexes and concaves are formed on the cover depending upon the presence or absence of air bubbles, then the user would have a sense of incongruity when touching the surface of the cover, which is not favorable.

The present invention has been made in view of the above circumstances, to provide a position detection apparatus wherein the labor and time for wiring for a detector positioned closely to the surface of the position detection apparatus can be reduced and the structure relating to wiring lines can be simplified.

According to another aspect of the present invention, a position detection apparatus is provided wherein air bubbles can be prevented from entering the surface of a detector.

According to one embodiment of the present invention, there is provided a position detection apparatus including a sensor substrate having a detection region in which position detecting electrodes are formed and a wiring line region in which wiring lines led out from the position detecting electrodes are disposed, a processing circuit connected to the wiring lines of the sensor substrate and configured to carry out a predetermined signal process based on a signal from the sensor substrate, and a housing having the sensor substrate placed thereon and having the processing circuit provided therein, the sensor substrate placed on the housing having a through-hole provided therein in the proximity of the detection region for allowing the wiring lines to be threaded therethrough.

With the position detection apparatus, wiring is carried out by threading the wiring line region of the flexible sensor substrate through the through-hole provided in the housing. Therefore, the necessity for a structure for leading out signal lines which is prepared separately for wiring and the labor for connecting the signal lines is eliminated.

The position detection apparatus may further include a magnetic flux detecting substrate provided at a position of the housing opposing the sensor substrate and having one or more loop coils formed thereon for detecting magnetic fluxes generated by a coil provided in a position pointer.

With the position detection apparatus, the overall surface of the sensor substrate provided on the housing can be used as a region for use (effective region) with the position pointer.

The position detection apparatus may be configured such that the wiring line region of the sensor substrate includes a neighboring wiring line region neighboring with a periphery of the detection region and having the wiring lines connected to the position detecting electrodes, and a lead wiring line region having wiring lines used for connection between the wiring lines in the neighboring wiring line region and the processing circuit, the lead wiring line region extending from the neighboring wiring line region in such a manner as to extend through the through-hole.

With the position detection apparatus, a substantially overall area of the sensor substrate can be utilized effectively.

Preferably, at least the lead wiring line region of the sensor substrate is formed from a flexible substrate.

Preferably, a recessed portion is formed at a position of an outer periphery of the sensor substrate which neighbors with the lead wiring line region.

Preferably, the position detection apparatus further include a sheet member having an area greater than the total area of the detection region and the neighboring wiring line region and disposed so as to cover the surface of the sensor substrate, and a support member disposed at a position at which the support member is shielded from the outside by the sheet member and having a thickness equal to that of the sensor substrate.

With the position detection apparatus, an end portion of the sheet member disposed on the surface can be prevented from being bent toward the gap between the sensor substrate and the side wall of an accommodation unit (to be described below) at a position corresponding to the gap.

Preferably, the position detection apparatus further includes an accommodation unit of a substantially concave shape provided on an upper face of the housing and having at least a bottom face for attaching the sensor substrate thereto, the through-hole being provided in the accommodation unit.

Preferably, the position detection apparatus further includes a sheet member disposed so as to cover the surface of the sensor substrate, the through-hole being formed at a position on the inner side with respect to a side wall of the accommodation unit at which the through-hole is shielded from the outside by the sheet member.

With the position detection apparatus, the internal structure can be prevented from being observed through the through-hole through a small gap formed around the sheet member on the surface.

The position detection apparatus may be configured such that a bonding agent for adhering the sensor substrate and a different member is provided in a region of at least one of the surface and the rear surface of the sensor substrate, the region being opposed to the position detecting electrodes. The position detection apparatus may be configured further that grooves formed by the provision of the bonding agent at the position opposing the position detecting electrodes are formed in such a manner as to be communicated at least one of the opposite ends thereof with an outer peripheral portion of the sensor substrate.

With the position detection apparatus, air bubbles entering the region in which the bonding agent is provided can be removed through the grooves. Consequently, deterioration of the accuracy in position detection can be prevented and a sense of incongruity which the user may experience can be eliminated.

The grooves may be formed in a checked pattern.

With the position detection apparatus, air bubbles entering the region in which the bonding agent is provided can escape over the overall area of the sensor substrate, and even if the groove is partly closed up with a foreign article or the like, a bypass path can be readily assured along which an air bubble can escape.

Preferably, where the bonding agent is provided on both of the surface and the rear surface of the sensor substrate, the grooves formed on the surface and the grooves formed on the rear surface are formed at positions at which the grooves do not overlap with each other except at positions at which the grooves intersect with each other.

With the position detection apparatus, where two layers of the bonding agent are provided, since the grooves do not overlap with each other, when a position corresponding to the groove is pointed to (or touched), the portion pointed to can be prevented from being deformed by a great amount.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

A position detection apparatus according to an embodiment of the present invention is described below with reference to the drawings.

Figure 1:
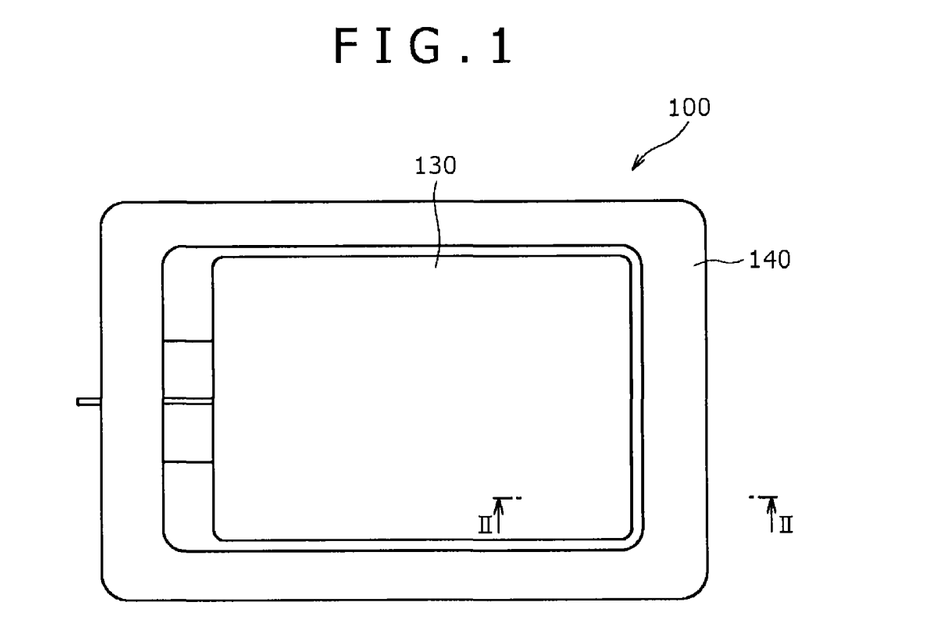
FIG. 1 is a plan view of a position detection apparatus according to an embodiment of the present invention.
Figure 2:
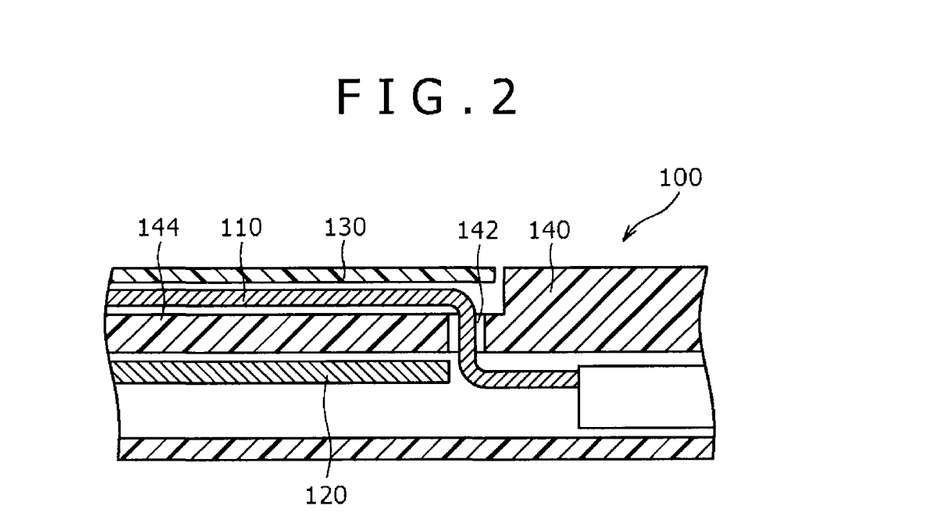
FIG. 2 is an enlarged sectional view taken along line II-II of FIG. 1.
Figure 3:
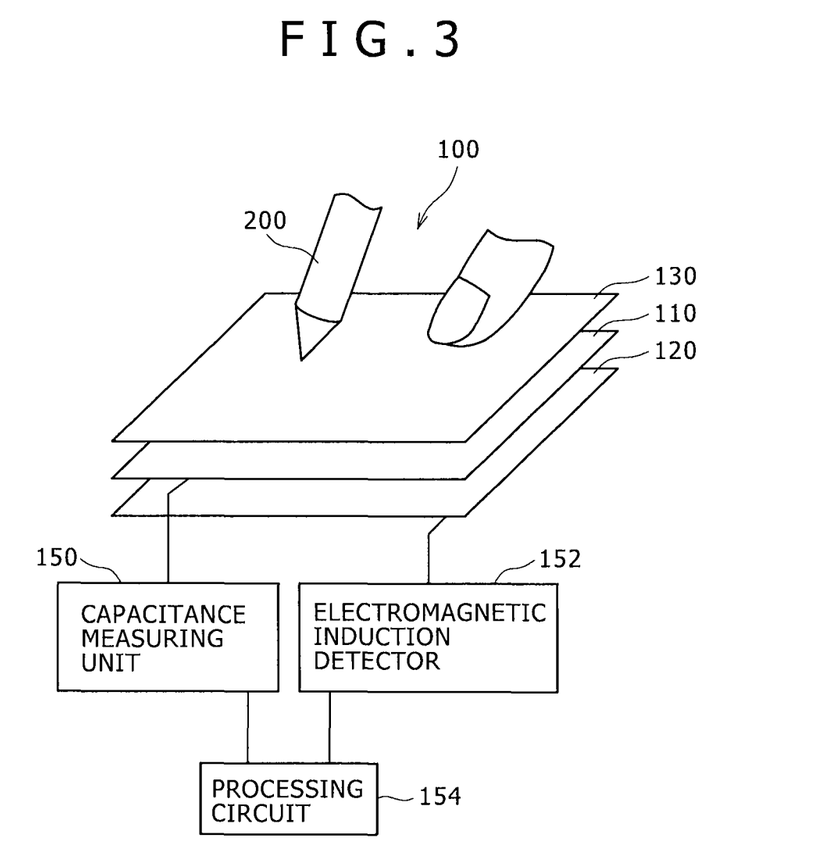
FIG. 3 is a schematic view illustrating operation of the position detection apparatus.

FIG. 1 shows the position detection apparatus of the present embodiment and FIG. 2 shows a cross section taken along line II-II of FIG. 1. Referring to FIGS. 1 and 2, the position detection apparatus 100 of the present embodiment is used to detect a position pointed to by part of the human body such as, for example, a fingertip, or by a position pointer 200 as seen in FIG. 3. The position detection apparatus 100 includes a sensor substrate 110 as a first detector for carrying out position detection using a capacitance system, a magnetic flux detecting substrate 120 as a second detector for carrying out position detection using electromagnetic induction, a sheet member 130 for covering the surface of the sensor substrate 110, a housing 140 having an accommodation unit 144 for accommodating the sensor substrate 110, magnetic flux detecting substrate 120 and sheet member 130, and such various circuits necessary for position detection as shown in FIG. 3. The position detection apparatus 100 is connected to an external apparatus not shown such as a personal computer or a PDA (Personal Digital Assistant) and is used as an inputting apparatus for the external apparatus. If the surface of the sheet member 130 is pointed to by a fingertip or a position pointer, then coordinate data of the position pointed to is outputted from the position detection apparatus 100 to the external apparatus. It is to be noted that, in the cross section shown in FIG. 2, in order to facilitate easy recognition and understanding, a gap is shown provided between the sheet member 130 and the sensor substrate 110 and between the sensor substrate 110 and the accommodation unit 144. Actually, however, the sheet member 130, sensor substrate 110 and accommodation unit 144 are adhered to each other by a bonding agent to assure a uniformly closely contacting state among them.

FIG. 3 illustrates operation of the position detection apparatus 100. Referring now to FIG. 3, the position detection apparatus 100 includes, as the circuits for carrying out position detection, a capacitance measuring unit 150, an electromagnetic induction detector 152 and a processing circuit 154. The capacitance measuring unit 150 measures the variation of the capacitance of a detection electrode provided on the sensor substrate 110 and is connected between the sensor substrate 110 and the processing circuit 154. The electromagnetic induction detector 152 detects the position of a point pointed to by a position pointer 200 utilizing electromagnetic induction and is connected between the magnetic flux detecting substrate 120 and the processing circuit 154. The processing circuit 154 calculates coordinate data of a point pointed to by a fingertip or the position pointer 200, which is detected using the sensor substrate 110 or the magnetic flux detecting substrate 120. The coordinate data calculated by the processing circuit 154 is sent to the external apparatus.

Figure 4:
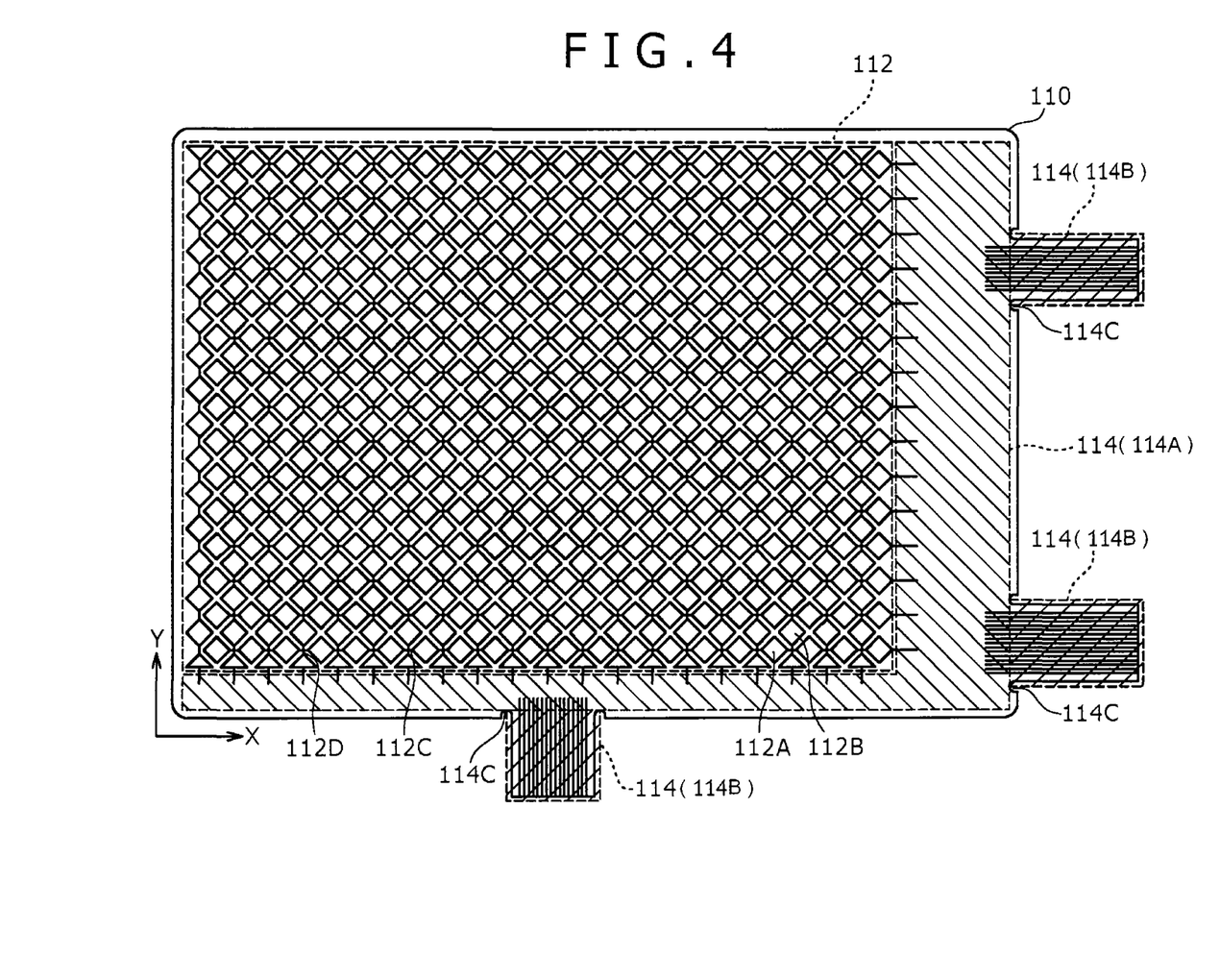
FIG. 4 is a plan view showing an entire sensor substrate of the position detection apparatus.
Figure 5:
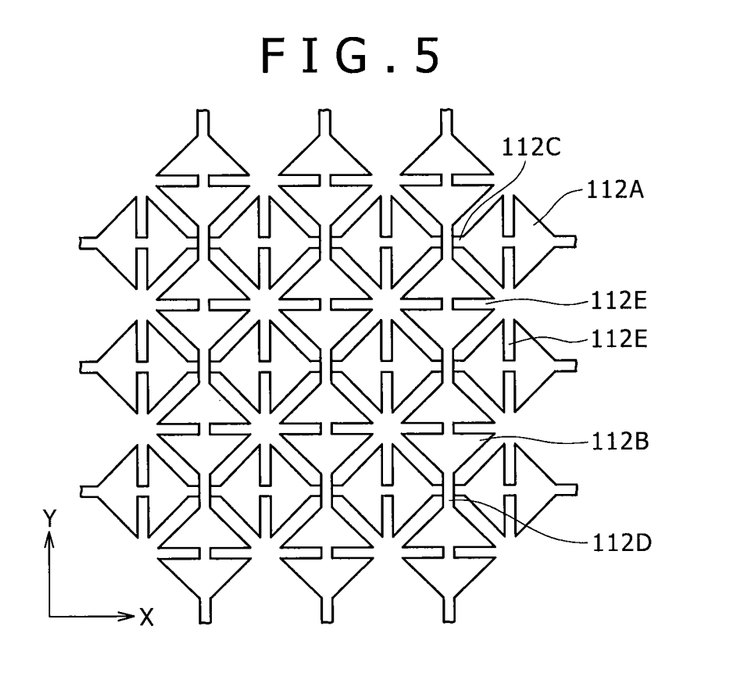
FIG. 5 is a partial plan view showing part of the sensor substrate in an enlarged scale.

Now, details of the sensor substrate 110 are described. FIG. 4 shows the entire sensor substrate 110 in a plan view and FIG. 5 shows part of the sensor substrate 110 in an enlarged scale.

The sensor substrate 110 is a flexible substrate in the form of a film substrate having flexibility, and, in the present embodiment, a PET (Polyethylene Terephthalate) substrate is used as the sensor substrate 110. It is to be noted that a film substrate other than a PET substrate such as, for example, a polyimide substrate may be used instead. The sensor substrate 110 includes a detection region 112 in which a plurality of detecting electrodes 112A and 112B are formed, and a wiring line region 114 in which wiring lines led out from the detecting electrodes 112A and 112B are laid.

The detecting electrodes 112A have a substantially square shape and are disposed regularly over an overall area of the detection region 112 such that one of a pair of diagonal lines thereof each extends along an X direction, which is a direction of the long side of the detection region 112 having a rectangular shape while the direction of the short side of the detection region 112 is defined as a Y direction. Those of the detecting electrodes 112A which are positioned adjacent to each other along the X direction are electrically connected to each other by an auxiliary line 112C, and a plurality of detection electrode groups each including such a plurality of detecting electrodes 112A connected in a row in the X direction by the auxiliary lines 112C are disposed along the Y direction.

Meanwhile, the detecting electrodes 112B have a substantially square shape similarly to the detecting electrodes 112A and are disposed regularly over an overall area of the detection region 112 such that one of a pair of diagonal lines thereof each extends along the Y direction. Those of the detecting electrodes 112B which are positioned adjacent to each other along the Y direction are electrically connected to each other by an auxiliary line 112D, and a plurality of detection electrode groups each including such a plurality of detecting electrodes 112B connected in a row in the Y direction by the auxiliary lines 112D are disposed along the X direction.

The detecting electrodes 112A and the detecting electrodes 112B are disposed regularly in the detection region 112 such that they individually fill gaps defined by the other ones of them. When a fingertip of a user touches the surface of the sheet member 130, the touching face of the fingertip opposes both of a detecting electrode 112A and a detecting electrode 112B simultaneously. It is to be noted that, although the auxiliary lines 112C and 112D intersect with each other, they are electrically isolated from each other. For example, the electric isolation between the auxiliary lines 112C and 112D is achieved by using the sensor substrate 110 which has two or more metal layers. Further, the detecting electrodes 112A and 112B have slits 112E formed at positions along the other diagonal lines for reducing eddy current produced by magnetic fluxes generated by the magnetic flux detecting substrate 120 or the position pointer 200. The shape of the slits 112E shown in FIG. 5 is an example, and the shape and the number of such slits 112E can be changed suitably.

The capacitance measuring unit 150 detects the variation of the capacitance of the detection electrode groups in the X direction formed from the plural detecting electrodes 112A in a unit of a group and detects the variation of the capacitance of the detection electrode groups in the Y direction formed from the plural detecting electrodes 112B in a unit of a group. The processing circuit 154 specifies detection electrode groups in the X direction and the Y direction whose capacitance indicates some increase in response to approaching of a fingertip, to thereby calculate the position pointed to by the fingertip.

The wiring line region 114 includes a neighboring wiring line region 114A in which wiring lines connected to the detecting electrodes 112A and 112B are included and lead wiring line regions 114B used for connection between the wiring lines included in the neighboring wiring line region 114A and the processing circuit 154 side, that is, the capacitance measuring unit 150. The neighboring wiring line region 114A and the lead wiring line regions 114B are disposed adjacent to the periphery of the detection region 112. In FIG. 4, the wiring line region 114 is indicated by slanting lines. However, the directions of the slanting lines in the neighboring wiring line region 114A and the lead wiring line region 114B are different from each other.

The region including both the detection region 112 and the wiring line region 114 has a rectangular shape, and one or a plurality of lead wiring line regions 114B extend outwardly from a peripheral edge or edges of the rectangular shape. In the example shown in FIG. 4, three lead wiring line regions 114B extend outwardly from two sides of the rectangular shape. Further, a pair of cutaway portions 114C of a concave shape are provided adjacent to each of the lead wiring line regions 114B on the outer periphery of the neighboring wiring line region 114A.

Connection between the sensor substrate 110 and the capacitance measuring unit 150 is established using the lead wiring line regions 114B. In particular, electric connection between the sensor substrate 110 and the capacitance measuring unit 150 is established by bending part of the wiring line region 114, particularly a root portion of each of the lead wiring line regions 114B, to deform or bend and draw the lead wiring line region 114B in the housing 140.

Figure 6:
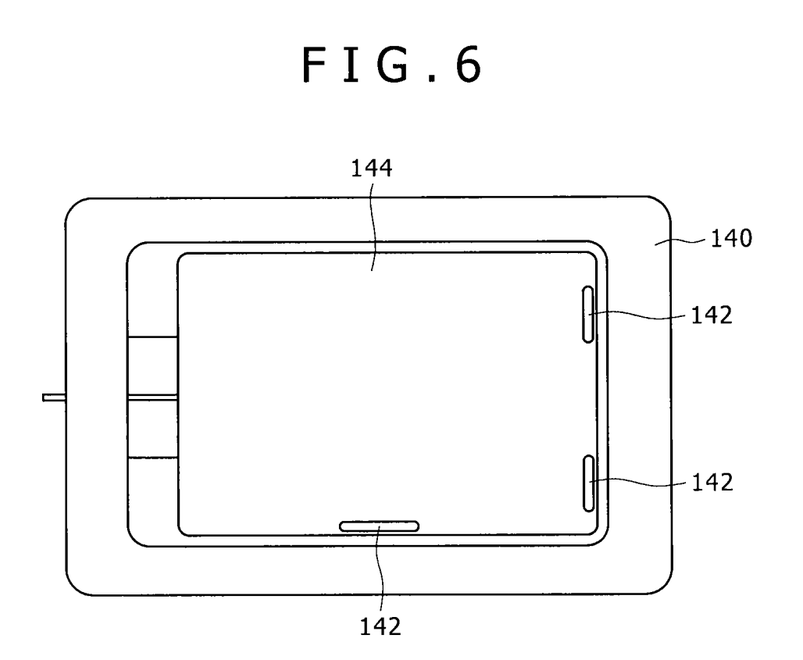
FIG. 6 is a plan view of a housing of the position detection apparatus showing details of through-holes.

To this end, three through-holes 142 are formed at positions in the housing 140 corresponding to the positions at which the lead wiring line regions 114B are provided. FIG. 6 shows a plan view of the housing 140 showing details of the through-holes. Referring to FIG. 6, the housing 140 has the accommodation unit 144 formed from a recessed portion of a rectangular shape at a position thereof corresponding to the sensor substrate 110 and the sheet member 130. As seen in FIG. 2, the depth of the accommodation unit 144 is set such that, when the sensor substrate 110 and the sheet member 130 are accommodated in the accommodation unit 144, the surface of the sheet member 130 is positioned at substantially the same height as the surface of the housing 140 around the accommodation unit 144. The three through-holes 142 are formed in the proximity of a periphery of the bottom face, that is, in the proximity of a side wall, of the accommodation unit 144. The through-holes 142 are formed on the inner side with respect to the side wall of the accommodation unit 144. By forming the through-holes 142 at such positions as described above, the entire through-holes 142 can be covered with the sheet member 130.

The lead wiring line regions 114B are bent at the root portion thereof, and the bent portions thereof are threaded through the through-holes 142 as seen in FIG. 2 and are connected at an end portion thereof to the capacitance measuring unit 150.

Figure 7:
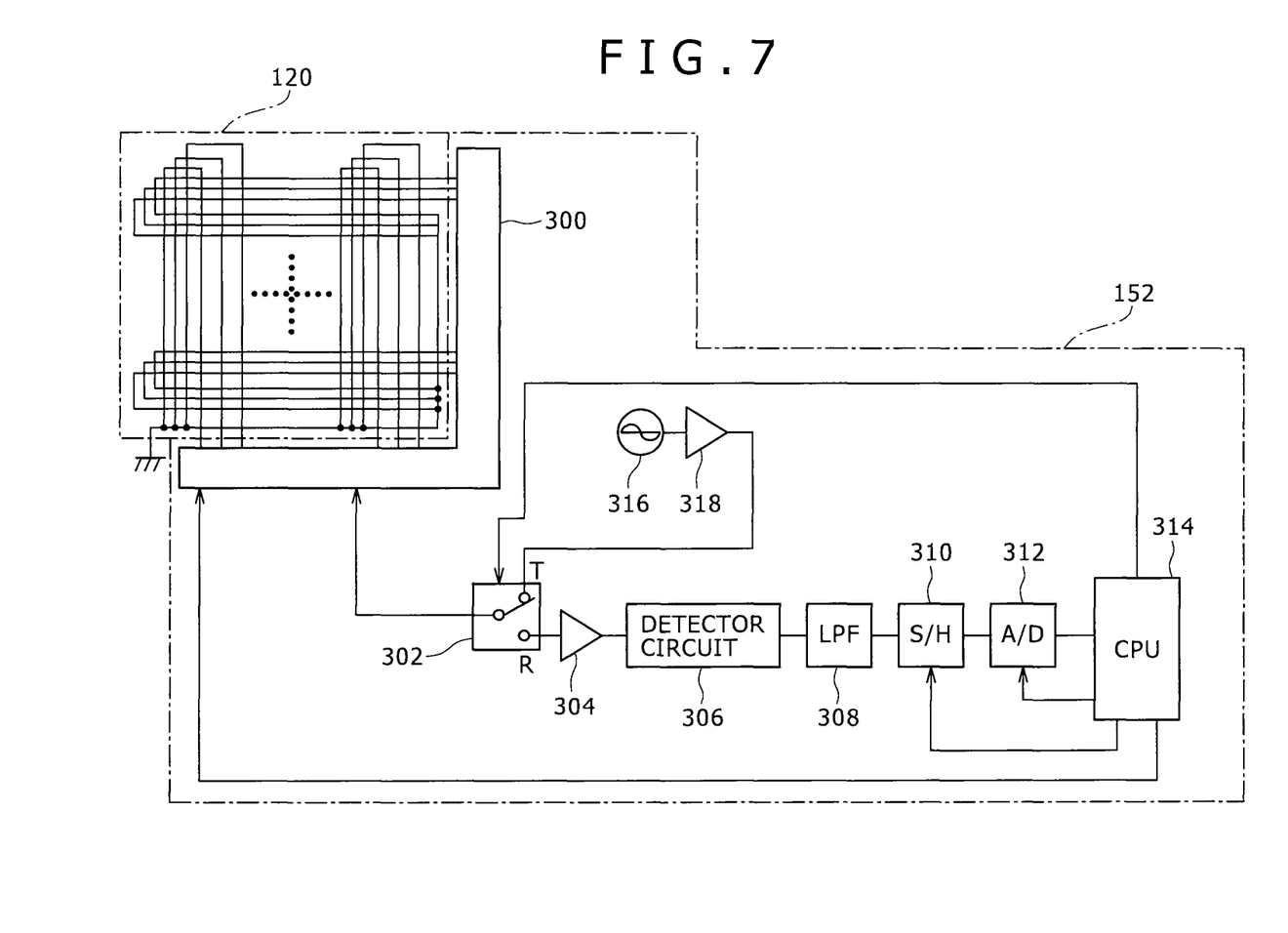
FIG. 7 is a block diagram illustrating position detection operation of the position detection apparatus using a magnetic flux detecting substrate.

Now, position detection carried out using the magnetic flux detecting substrate 120 is described. FIG. 7 illustrates position detection operation carried out using the magnetic flux detecting substrate 120. Referring to FIG. 7, the magnetic flux detecting substrate 120 is provided at a position of the surface or the rear face of the housing 140 opposing the sensor substrate 110. In the arrangement shown in FIG. 2, the magnetic flux detecting substrate 120 is disposed on the rear face side of the housing 140. However, the magnetic flux detecting substrate 120 may otherwise be disposed in a region of the surface of the housing 140 defined by the housing 140 and the sensor substrate 110.

The magnetic flux detecting substrate 120 includes a plurality of, for example, 40, loop coils in each of the X and Y directions which coincide with the X and Y directions of the sensor substrate 110 shown in FIG. 4, respectively.

The electromagnetic induction detector 152 includes a selection circuit 300, a transmission/reception changeover circuit 302, an amplifier 304, a detector circuit 306, a low-pass filter (LPF) 308, a sample hold circuit (S/H) 310, an analog to digital converter (A/D) 312, a CPU (Central Process Unit) 314, an oscillator 316 and a driver 318. The selection circuit 300 selects one of the loop coils provided on the magnetic flux detecting substrate 120 and connects the selected loop coil to the transmission/reception changeover circuit 302. In a state wherein the transmission/reception changeover circuit 302 is changed over to the transmission side (T), the loop coil selected by the selection circuit 300 and the driver 318 are in a connected state to each other, and if an AC signal of a predetermined frequency is outputted from the oscillator 316, then the driver 318 supplies current to the loop coil connected thereto so that a magnetic field is generated from the loop coil.

A resonance circuit including a coil and a capacitor connected in parallel is built in the position pointer 200. If the position pointer 200 is positioned in the proximity of the surface of the position detection apparatus 100 in a state wherein magnetic fluxes are generated from the loop coil, then a voltage induced in the coil in the position pointer 200 is applied to the capacitor so that charge is accumulated in the capacitor. Thereafter, if the transmission/reception changeover circuit 302 is changed over to the reception side (R), then the generation of a magnetic field from the loop coil is stopped and the charge accumulated in the capacitor till then is discharged from the position pointer 200 so that current flows through the coil. Consequently, a magnetic field is generated from the coil. If, in this state, the loop coil selected by the selection circuit 300 is changed over, then the position of the position pointer 200 is specified by detecting the intensity of a signal outputted from each loop coil. In particular, the detection of the signal intensity is carried out by carrying out a detection process, for example, an AM detection process by means of the detector circuit 306 for a signal amplified by the amplifier 304, converting the detected signal that has passed through the LPF 308 into digital data using the sample hold circuit 310 and the analog to digital converter 312, and then processing the digital data by means of the CPU 314.

In this manner, in the position detection apparatus 100 of the present embodiment, since wiring for the wiring line region 114 of the sensor substrate 110 having flexibility is carried out by threading wiring lines into the through-holes 142 provided in the accommodation unit 144 of the housing 140, the necessity for a structure for leading out signal lines which is prepared separately for wiring and the labor for connecting the signal lines is eliminated. Particularly, where the sensor substrate 110 and the magnetic flux detecting substrate 120 are used in combination, the overall surface of the sensor substrate 110 accommodated in the accommodation unit 144 of the housing 140 can be used as an effective area for the position pointer 200.

Further, since the wiring line region 114 includes the neighboring wiring line region 114A and the lead wiring line regions 114B and the lead wiring line regions 114B extending from the neighboring wiring line region 114A are threaded through the through-holes 142, a substantially overall area of the sensor substrate 110, that is, a region corresponding to the detection region 112 and the neighboring wiring line region 114A, can be utilized effectively.

Further, since the cutaway portions 114C are provided at positions of an outer periphery of the neighboring wiring line region 114A adjacent to the lead wiring line regions 114B, the lead wiring line regions 114B can be prevented from projecting to the outer sides of the region including the detection region 112 and the neighboring wiring line region 114A.

Further, since the sheet member 130 is provided such that it is disposed so as to cover the surface of the sensor substrate 110 and the through-holes 142 are formed at positions on the inner side with respect to the side wall of the accommodation unit 144 at which the through-holes 142 are shielded from the outside by the sheet member 130, the internal structure can be prevented from being observed through the through-holes 142 through a small gap formed around the sheet member 130 on the surface.

Figure 8:
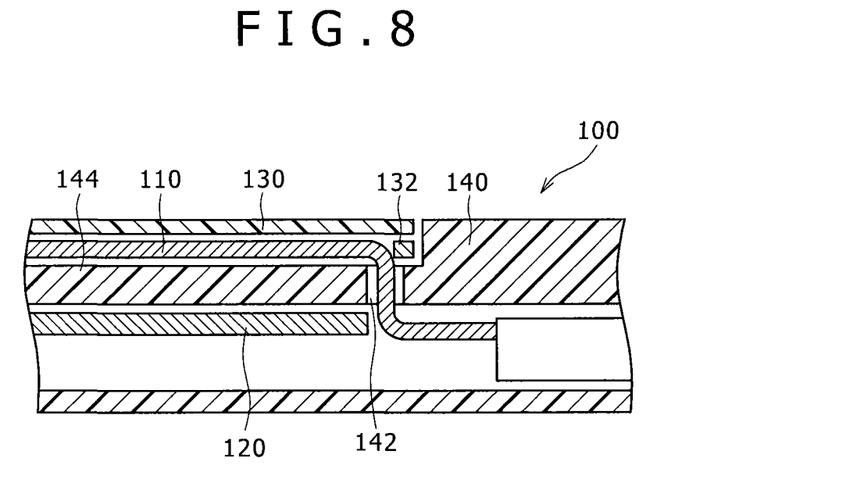
FIG. 8 is a sectional view showing a modification to the position detection apparatus.

It is to be noted that, where the sheet member 130 has an area greater than that of the region which includes both of the detection region 112 and the neighboring wiring line region 114A of the sensor substrate 110, a support member 132 may be provided such that it is disposed at a position shielded from the outside by the sheet member 130 and has a thickness equal to that of the sensor substrate 110 as seen in FIG. 8. By the support member 132, an end portion of the sheet member 130 disposed on the surface can be prevented from being bent toward the gap between the sensor substrate 110 and the side wall of the accommodation unit 144 at a position corresponding to the gap.

Incidentally, a bonding agent is applied to the surface and the rear face of the flexible sensor substrate 110 to adhere the sensor substrate 110 and another member, that is, the sheet member 130 and housing 140, to each other.

Figure 9:
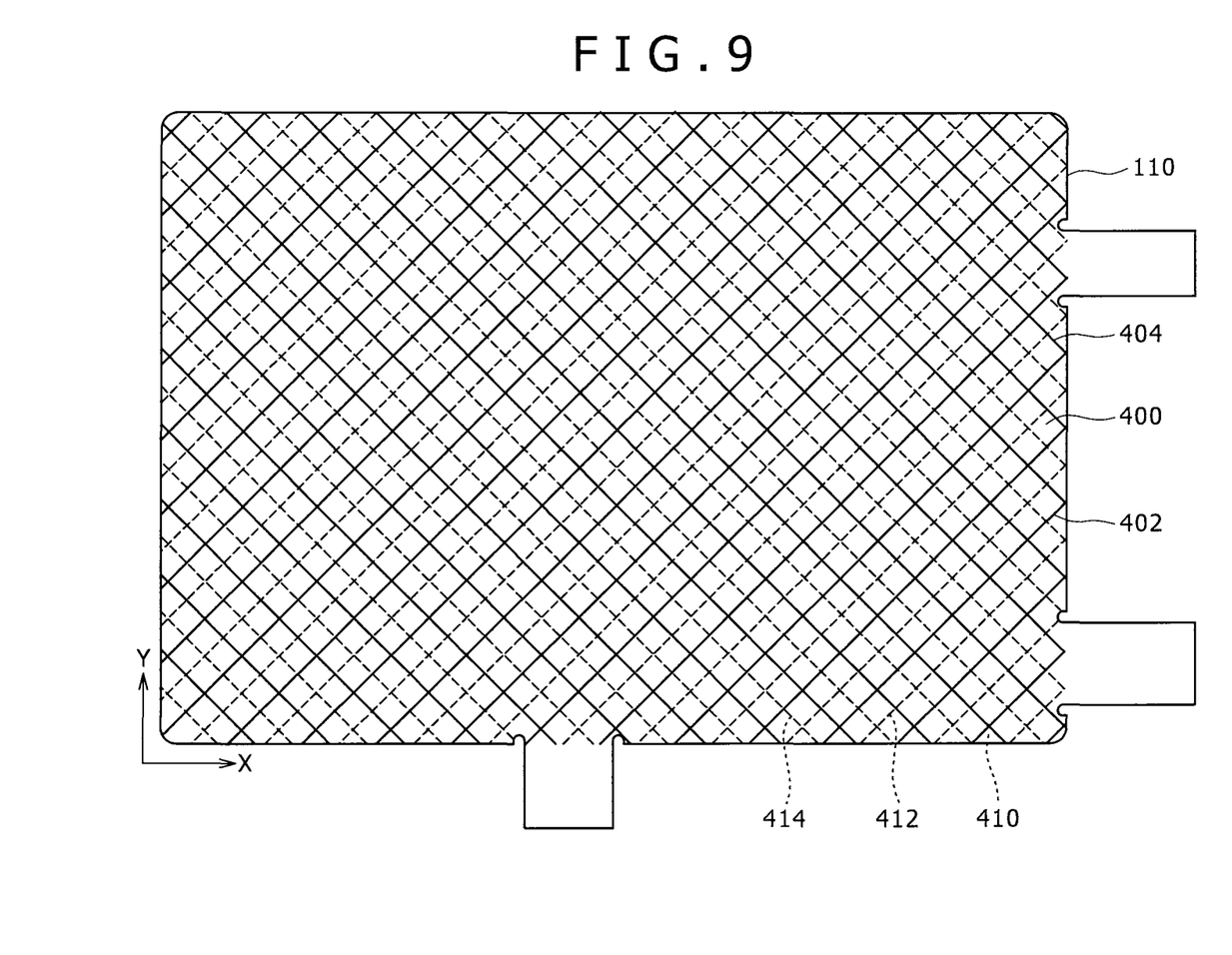
FIG. 9 is a schematic view showing adhering faces on both surfaces of the sensor substrate.
Figure 10:
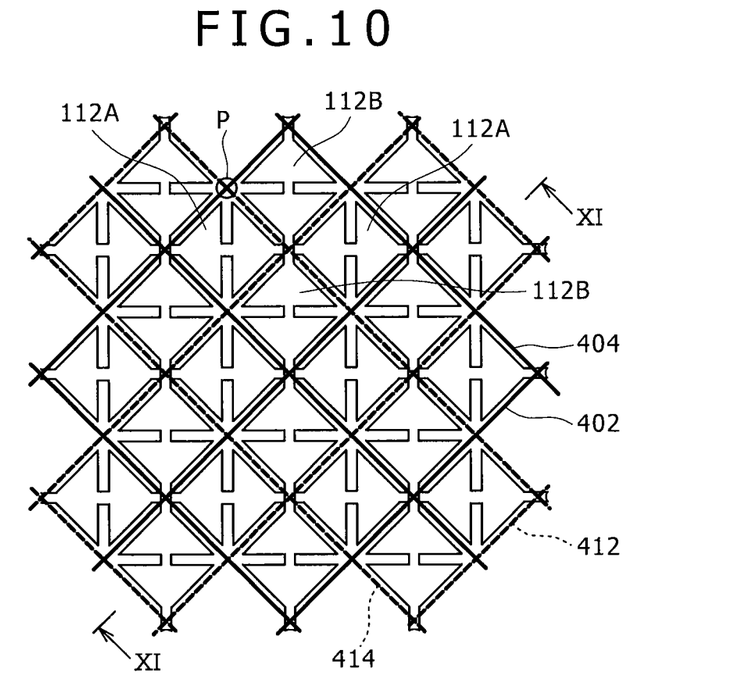
FIG. 10 is a partial enlarged view of the sensor substrate.
Figure 11:
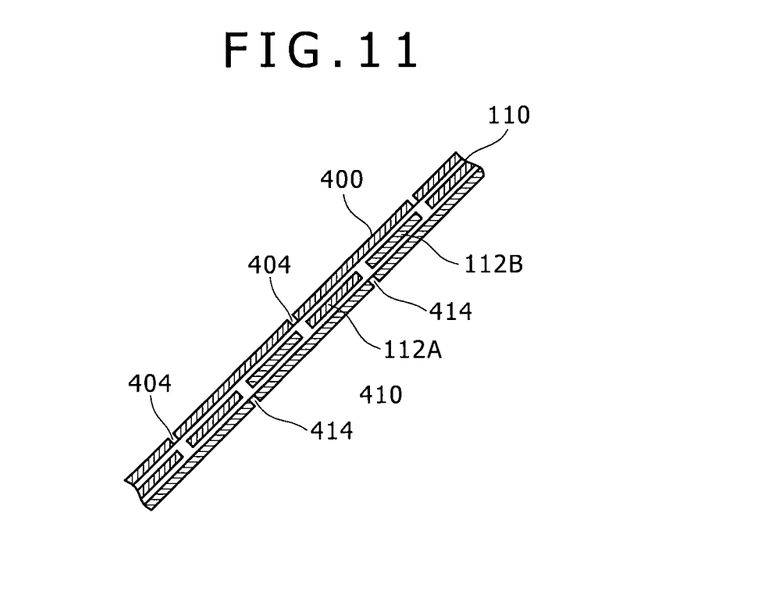
FIG. 11 is a sectional view taken along line XI-XI of FIG. 10.

FIG. 9 shows the adhering faces formed by applying the bonding agent to both of the opposite surfaces (front and rear) of the sensor substrate 110. Meanwhile, FIG. 10 shows part of the sensor substrate 110 in an enlarged scale and FIG. 11 shows a cross section taken along line XI-XI of FIG. 10. Referring to FIGS. 9 to 11, the sensor substrate 110 has an adhering face 400 formed by applying the bonding agent to the surface thereof and another adhering face 410 formed by applying the bonding agent to the rear face thereof.

On the adhering face 400 on the surface side, a plurality of grooves 402 are formed in a spaced relationship by a predetermined distance from each other and extend in a direction inclined by 45 degrees with respect to the X direction. Further, a plurality of grooves 404 are formed in a spaced relationship by a predetermined distance from each other and extend in a direction inclined by 135 degrees with respect to the X direction. The grooves 402 and 404 are formed in a checked pattern on the adhering face 400 such that they are communicated with an outer periphery of the sensor substrate 110. In other words, the adhering face 400 is provided in regions each opposing a total of four detecting electrodes 112A and 112B, and the check-patterned grooves 402 and 404 described above are formed in a region in which the adhering face 400 does not oppose the detecting electrodes 112A and 112B. Further, the adhering face 400 opposing the detecting electrodes 112A and 112B has a uniform thickness.

Similarly, on the adhering face 410 on the rear face side, a plurality of grooves 412 are formed in a spaced relationship by a predetermined distance from each other and extend in a direction inclined by 45 degrees with respect to the X direction, and a plurality of grooves 414 are formed in a spaced relationship by a predetermined distance from each other and extend in a direction inclined by 135 degrees with respect to the X direction. The grooves 412 and 414 are formed in a checked pattern on the adhering face 410 such that they are communicated with an outer periphery of the sensor substrate 110. In other words, the adhering face 410 is provided in regions each opposing a total of four detecting electrodes 112A and 112B, and the checked-pattern grooves 412 and 414 are provided in a region in which the adhering face 410 does not oppose the detecting electrodes 112A and 112B. Further, the adhering face 410 opposing the detecting electrodes 112A and 112B has a uniform thickness.

Further, the grooves 402 and 404 on the front face side and the grooves 412 and 414 on the rear face side described above are formed at positions displaced from each other by one pitch of the detecting electrodes 112A and 112B such that they do not overlap with each other at any other position than the positions at which they intersect with each other. It is to be noted that one of the positions at which the grooves intersect with each other is indicated by reference character P in FIG. 10.

In this manner, in the position detection apparatus 100 of the present embodiment, air bubbles entering the regions in which the adhering faces 400 and 410 are formed can be removed through the grooves 402, 404 and 412, 414, respectively. Consequently, deterioration of the accuracy in position detection can be prevented, and a sense of incongruity which the user may experience can be eliminated.

Further, since the grooves 402 and 404 formed on the front face and the grooves 412 and 414 formed on the rear face are formed at positions other than the positions at which they overlap with each other, also where the adhering faces 400 and 410 in the two layers are provided, when a position corresponding to a groove 402, 404, 412 or 414 is pointed to (or touched), the portion pointed to can be prevented from being deformed by a great amount. Since the grooves 402 and 404 or the grooves 412 and 414 are formed in a checked pattern, air bubbles entering the adhering faces 400 and 410 can escape over the overall area of the sensor substrate 110, and even if a groove 402 or 404 or a groove 412 or 414 is partly closed up with a foreign article or the like, a bypass path can be readily assured along which an air bubble can escape.

It is to be noted that the present invention is not limited to the specific embodiment described above, but may be modified in various manners without departing from the subject matter of the present invention. For example, while, in the example shown in FIGS. 9 to 11 in the embodiment described hereinabove, the adhering faces 400 and 410 are provided on the opposite faces of the sensor substrate 110, they may otherwise be provided on only one of the faces of the sensor substrate 110. Alternatively, in place of providing the adhering face 400 on the front face of the sensor substrate 110 and providing the adhering face 410 on the rear face of the sensor substrate 110, the adhering face 400 may be provided on the sheet member 130 side or the adhering face 410 may be provided on the accommodation unit 144 side of the housing 140.

Further, while, in the embodiment described hereinabove, the sensor substrate 110 and the magnetic flux detecting substrate 120 are used in combination, the present invention can be applied also in a position detection apparatus which includes only the sensor substrate 110 of the capacitance type.

Further, while, in the embodiment described hereinabove, the entire sensor substrate 110 is formed from a flexible film substrate, the body portion of the sensor substrate 110 including the detection region 112 and the neighboring wiring line region 114A and the lead wiring line region 114B may be formed from different materials from each other such that only the lead wiring line region 114B is formed from a flexible material.

In summary, according to the present invention, since wiring on the detection region 112 of the flexible sensor substrate 110 is carried out by threading wiring lines into the through-holes 142 formed in the accommodation unit 144 of the housing 140, the necessity for a structure for leading out signal lines which is prepared separately for wiring and the labor for connecting the signal lines is eliminated.

An embodiment of the present invention has been described above. However, the present invention is not limited to the above-described embodiment, but includes other examples of modification and examples of application without departing from the spirit of the present invention described in claims.

What is claimed is:
1. A position detection apparatus, comprising:
a sensor substrate integrally including a detection region, in which position detecting electrodes are formed, and a wiring line region, in which wiring lines led out from said position detecting electrodes are disposed, the wiring line region including a lead wiring line region, and the sensor substrate including a top surface and a bottom surface;
a magnetic flux detecting substrate provided beneath the bottom surface of the sensor substrate and having one or more loop coils formed thereon for detecting magnetic fluxes generated by a coil provided in a position pointer;
a processing circuit provided adjacent to the magnetic flux detecting substrate, the processing circuit being connected to said wiring lines of said sensor substrate via said lead wiring line region of said sensor substrate, and configured to carry out a predetermined signal process based on a signal from said sensor substrate;
a housing having an accommodation surface, on which said sensor substrate is supported, and an internal space, in which said magnetic flux detecting substrate is placed at a position beneath the sensor substrate and said processing circuit is placed adjacent to the magnetic flux detecting substrate such that the processing circuit and the sensor substrate do not overlap as viewed along a direction perpendicular to the top surface of the sensor substrate, the housing defining a through-hole at a periphery of the accommodation surface, and said lead wiring line region of the sensor substrate supported on the accommodation surface being threaded through the through-hole into the internal space of the housing to connect to the processing circuit placed therein; and
a sheet member disposed over the top surface of said sensor substrate, the sheet member being sized to cover the accommodation surface including the through-hole,
wherein said sensor substrate includes two cutaway portions respectively formed at two corners between an outer periphery of said sensor substrate and two side edges of said lead wiring line region.

2. The position detection apparatus according to claim 1, wherein
said wiring line region of said sensor substrate includes a neighboring wiring line region neighboring with a periphery of said detection region and having the wiring lines connected between said position detecting electrodes and the lead wiring line region, and
said lead wiring line region extends from said neighboring wiring line region to be threaded through said through-hole.

3. The position detection apparatus according to claim 2, wherein at least said lead wiring line region of said sensor substrate is formed from a flexible substrate.

4. The position detection apparatus according to claim 2, wherein:
said sheet member has an area greater than a total area of said detection region and said neighboring wiring line region; and
a support member is disposed beneath a periphery of said sheet member so that the sheet member shields said support member from the outside, said support member having a thickness equal to that of said sensor substrate.

5. The position detection apparatus according to claim 1, wherein the housing includes
an accommodation unit of a substantially concave shape having said accommodation surface as a bottom face thereof.

6. The position detection apparatus according to claim 1, wherein a bonding agent for adhering said sensor substrate and a different member is provided in regions of at least one of the top surface and the bottom surface of said sensor substrate, the regions corresponding to said position detecting electrodes.

7. The position detection apparatus according to claim 6, wherein grooves are formed between the regions made of said bonding agent, the grooves being communicated with an outer peripheral portion of said sensor substrate.

8. The position detection apparatus according to claim 7, wherein said grooves are formed in a checked pattern.

9. The position detection apparatus according to claim 8, wherein, in a case where said bonding agent is provided on both of the top surface and the bottom surface of said sensor substrate, the grooves formed on the top surface surface are disposed to overlap with the grooves formed on the bottom surface except at positions at which the grooves intersect with each other.

* * * * *

UNITED STATES PATENT AND TRADEMARK OFFICE
CERTIFICATE OF CORRECTION

| | | |
|---|---|---|
| PATENT NO. | : 9,110,542 B2 | Page 1 of 1 |
| APPLICATION NO. | : 12/844217 | |
| DATED | : August 18, 2015 | |
| INVENTOR(S) | : Yokota et al. | |

It is certified that error appears in the above-identified patent and that said Letters Patent is hereby corrected as shown below:

On the title page item (54) and in the specification, column 1, line 1,
"POSITION DETECTION APPARATUS WITH A MAGNETIC FLUX DETECTING SUBSTRATE" should read, --POSITION DETECTION APPARATUS--.

Signed and Sealed this
Twenty-ninth Day of December, 2015

Michelle K. Lee
*Director of the United States Patent and Trademark Office*